United States Patent
Bolasna et al.

(10) Patent No.: US 7,817,371 B2
(45) Date of Patent: Oct. 19, 2010

(54) ACTIVE COMPENSATION OF FLYING HEIGHT IN MAGNETIC DISK DRIVES

(75) Inventors: Sanford A. Bolasna, San Jose, CA (US); Norbert A. Feliss, Aptos, CA (US); Karl A. Flechsig, Los Gatos, CA (US); Donald R. Gillis, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 12/328,309

(22) Filed: Dec. 4, 2008

(65) Prior Publication Data

US 2010/0142092 A1 Jun. 10, 2010

(51) Int. Cl.
  *G11B 21/02* (2006.01)
(52) U.S. Cl. ....................................... 360/75
(58) Field of Classification Search ........................ None
  See application file for complete search history.

(56) References Cited

U.S. PATENT DOCUMENTS

| | | | |
|---|---|---|---|
| 5,991,113 A * | 11/1999 | Meyer et al. ................... 360/75 |
| 7,342,736 B1 | 3/2008 | Turner et al. | |
| 7,518,818 B2 * | 4/2009 | Yamazaki et al. ............. 360/75 |
| 7,619,857 B2 * | 11/2009 | Kurita et al. ............. 360/235.3 |
| 2007/0230017 A1 | 10/2007 | Hiller et al. | |
| 2007/0268615 A1 | 11/2007 | McFadyen et al. | |
| 2008/0130152 A1 | 6/2008 | Kameyama | |

* cited by examiner

*Primary Examiner*—K. Wong
(74) *Attorney, Agent, or Firm*—Duft Bornsen & Fishman, LLP

(57) ABSTRACT

Magnetic disk drives and associated methods are described for performing an active flying height compensation process for a slider of a magnetic disk drive. For the flying height compensation process, a control system in the disk drive detects a reduction in flying height of a slider in the disk drive. The control system then calculates a compensation heating power to apply to one or more heating elements that are fabricated in the slider to compensate for the reduction in flying height. The control system then applies the compensation heating power to the heating element(s) in the slider to alter the ABS (i.e., generate a protrusion) and increase the flying height of the slider.

25 Claims, 8 Drawing Sheets

ACTIVE COMPENSATION OF FLYING HEIGHT IN MAGNETIC DISK DRIVES

BACKGROUND OF THE INVENTION

1. Field of the Invention

The invention is related to the field of magnetic disk drives, and in particular, to compensating for the flying height of sliders in magnetic disk drives, such as due to changes in environmental conditions.

2. Statement of the Problem

Many computer systems use magnetic disk drives for mass storage of information. Magnetic disk drives typically include one or more sliders having a read head and a write head. An actuator/suspension arm holds the slider above the surface of the magnetic disk. When the magnetic disk rotates, an air flow generated by the rotation of the magnetic disk causes an air bearing surface (ABS) side of the slider to fly a particular height above the magnetic disk. As the slider flies on the air bearing, a voice coil motor (VCM) moves the actuator/suspension arm to position the read/write head over selected tracks of the magnetic disk. The read/write head may then read data from or write data to the tracks of the magnetic disk.

As the density of magnetic disks increases, it has become more important to precisely control the clearance or spacing between the read/write head and the surface of the magnetic disk. The clearance between the read/write head and the surface of the magnetic disk depends on the flying height of the slider. The flying height of the slider is controlled by the shape of the ABS and the rotational speed of the magnetic disk. As the magnetic disk rotates, the slider rides on an air flow at a flying height determined by the shape of the ABS of the slider. Disk drive manufacturers have developed desired ABS shapes that allow for desired flying heights, such as in the range of 8-12 nanometers.

Disk drive manufacturers may want to decrease the clearance between the read/write head and the surface of the magnetic disk without having to further decrease the flying height of the slider and risk having the slider contact the magnetic disk (referred to as head-to-disk contact). One way to decrease the head-to-disk clearance is to cause a protrusion of the read/write head toward the surface of the magnetic disk. The read/write head is fabricated from materials that are different than the rest of the slider body. These materials expand and contract due to temperature at different rates than the slider body. Disk drive manufacturers take advantage of these material properties by embedding one or more heating elements in the read/write head or proximate to the read/write head. A heating power may then be applied to the heating element(s) to generate a protrusion of the read/write head from the ABS of the slider. Controlling the protrusion of a read/write head through the application of a certain heating power to the heating element is referred to herein as Thermal Flying-height Control (TFC).

One problem with present disk drives is that the flying height of a slider may decrease when the disk drive is put into operation under certain conditions. For example, the flying height of a slider is sensitive to changes in environmental conditions, such as altitude changes, temperature changes, etc. When the disk drive is at the manufacturer, the flying height of the slider is determined at sea level using algorithms. The electrical channel function of the disk drive provides flying height measurement capabilities either directly or indirectly by evaluating the Wallace Spacing Loss algorithm on a readback signal to determine if the flying height of the slider is acceptable. The initial flying height that is measured by the manufacturer during calibration is referred to herein as an expected or desired flying height. When the disk drive is subsequently put into operation, different environmental conditionals may cause a reduction in the expected flying height of the slider. For example, at higher elevations, the flying height of a slider may lose 2-3 nanometers (using a typical value of 10 nanometers obtained at sea level), which may represent a loss of approximately 20-30% of the expected or desired flying height. At higher temperatures, a similar change in flying height may be observed. If the flying height of a slider is allowed to change by 20-30% due to changes in environmental conditions, then there is an increased risk of head-to-disk contact and a loss of data. If altitude and temperature effects were to be combined, then the flying height loss may be closer to 40-50% (loss of 4-5 nanometers from the typical 10 nanometers obtained at sea level). This unfortunately results in disk drives having lower reliability.

SUMMARY

Embodiments of the invention solve the above and other related problems by actively compensating for a reduction in flying height of a slider by using heating elements to alter the ABS of the slider. One or more heating elements are fabricated in the slider to generate one or more protrusions in the ABS of the slider. For instance, a heating element may be fabricated toward the trailing end of the slider, such as for TFC. A heating element may additionally or alternatively be fabricated in a center region of the slider, toward the side rails of the ABS, or in other positions. The flying height of the slider is monitored, such as upon power up of the disk drive. If a reduction in the flying height of the slider is detected, then a compensation heating power is calculated and applied to the heating element(s) to generate one or more protrusions in the ABS of the slider. The protrusion(s) in the ABS creates more lift for the slider, and consequently results in an increased flying height. By using one or more heating elements to adjust the flying height of the slider, head-to-disk contact and data loss can advantageously be avoided particularly in situations when environmental conditions have changed.

One embodiment of the invention comprises a magnetic disk drive operable to perform active flying height compensation for a slider. The magnetic disk drive includes a magnetic disk, a slider having an air bearing surface (ABS) that faces a surface of the magnetic disk, and one or more heating element fabricated in the slider. The heating element or elements may be fabricated proximate to a read/write head in the slider (or a trailing end), may be fabricated in a center region of the slider, and/or may be fabricated in other ABS locations on the entire horizontal plane of the head. The magnetic disk drive includes a dynamic control system operable to detect a reduction in flying height of the slider. The control system is further operable to calculate a compensation heating power to apply to the heating element(s) in the slider to compensate for the reduction in flying height. The control system is further operable to apply the compensation heating power to the heating element(s) in the slider to alter the ABS (i.e., generate one or more protrusions) and increase the flying height of the slider.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-15 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
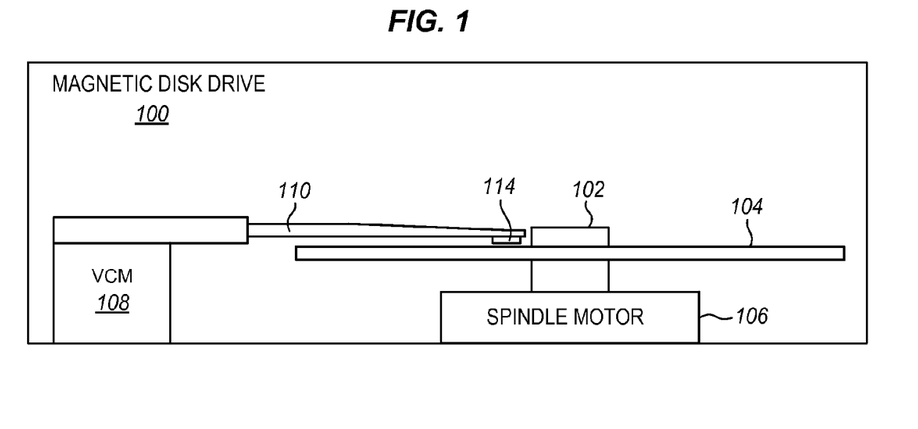
FIG. 1 illustrates a magnetic disk drive.

FIG. 1 illustrates a magnetic disk drive 100 in an exemplary embodiment of the invention. Magnetic disk drive 100 includes a spindle 102 that supports a magnetic disk 104. The spindle 102 is connected to a spindle motor 106 that is operable to rotate spindle 102 responsive to a motor current in order to rotate magnetic disk 104. Magnetic disk drive 100 further includes an actuator/suspension arm 110 that supports a slider 114 over a surface of magnetic disk 104. Although not visible in FIG. 1, slider 114 includes a read/write head proximate to its trailing end. Actuator/suspension arm 110 is connected to a voice coil motor (VCM) 108 that is operable to pivot actuator/suspension arm 110 responsive to a VCM current in order to position the read/write head of slider 114 over desired tracks of magnetic disk 104. Magnetic disk drive 100 may include other devices, components, or systems not shown in FIG. 1. For instance, magnetic disk drive 100 may include a plurality of magnetic disks 104 connected to spindle 102 and a plurality of actuator/suspension arms 110 supporting sliders 114 over surfaces of the magnetic disks 104.

Figure 2:
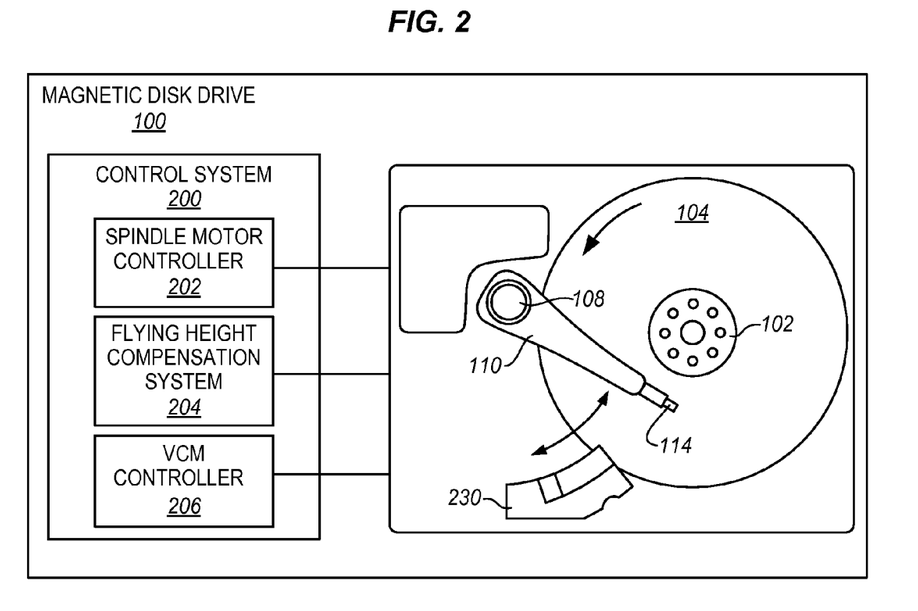
FIG. 2 is a top view of a magnetic disk drive in an exemplary embodiment of the invention.

FIG. 2 is a top view of magnetic disk drive 100 in an exemplary embodiment of the invention. In this view, magnetic disk drive 100 further includes a control system 200. Control system 200 includes a spindle motor controller 202 that is operable to apply a motor current to spindle motor 106 (not visible in FIG. 2), which controls the rotational speed of magnetic disk 104. Control system 200 further includes a flying height compensation system 204 that is operable to calculate the flying height of slider 114 and apply a heating power to one or more heating elements (not shown) in slider 114 to compensate for a reduction in flying height of slider 114. The flying height of slider 114 at the location of the read/write head is calculated via the electrical channel by suitable algorithms such as the Wallace spacing loss. Control system 200 further includes a VCM controller 206 that is operable to apply a positional voltage to VCM 108 to control the position of actuator/suspension arm 110. Although a VCM controller 206 is illustrated in this embodiment, those skilled in the art will appreciate that any type of motor controller may be used to control the position of actuator/suspension arm 110.

Control system 200, and the individual systems within control system 200, may be implemented as hardware, software, firmware, or some combination of these. For example, flying height compensation system 204 may be implemented as a processor executing instructions, a programmable gate array, a circuit or circuitry, logic, or some other physical electronic implementation. Flying height compensation system 204 may be implemented as individual systems, subsystems, modules, or components configured to perform functions described herein.

Magnetic disk drive 100 further includes a ramp assembly 230. Instead of using Contact Start-Stop (CSS) functionality, magnetic disk drive 100 uses ramp load/unload functionality when disk drive 100 is powered down or operation is otherwise halted. For ramp load/unload functionality, slider 114 is moved off of magnetic disk 104 by VCM controller 206 prior to power down, as indicated by the arrow. Slider 114 is moved onto a ramp assembly 230 and safely positioned on ramp assembly 230 while magnetic disk drive 100 is powered down. Moving slider 114 from a position proximate to the surface of the magnetic disk 104 to ramp assembly 230 is referred to as "unloading" the slider 114 from magnetic disk 104. When magnetic disk drive 100 subsequently powers on, slider 114 is again moved off of ramp assembly 230 when magnetic disk 104 reaches the appropriate rotational speed. Moving slider 114 from ramp assembly 230 to a position proximate to the surface of the magnetic disk 104 is referred to as "loading" the slider 114 onto magnetic disk 104.

Figure 3:
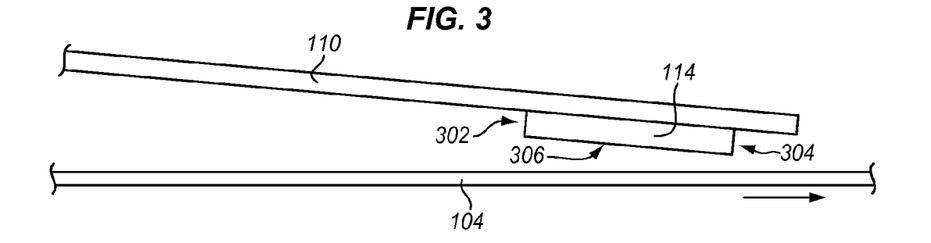
FIG. 3 illustrates a slider flying over a surface of a magnetic disk in an exemplary embodiment of the invention.

FIG. 3 illustrates slider 114 flying over a surface of magnetic disk 104 in an exemplary embodiment of the invention. Slider 114 is supported above the surface of magnetic disk 104 by actuator/suspension arm 110. Slider 114 includes a leading end 302 and an opposing trailing end 304 (which is also referred to as a deposited end) in which a read/write head is fabricated. As magnetic disk 104 rotates in the direction indicated by the arrow, the rotation generates an air flow on the surface of magnetic disk 104. An air bearing surface (ABS) 306 of slider 114, which faces toward the surface of magnetic disk 104, flies on the air bearing. The shape of ABS 306 defines the flying height of slider 114 over the surface of magnetic disk 104.

Figure 4:
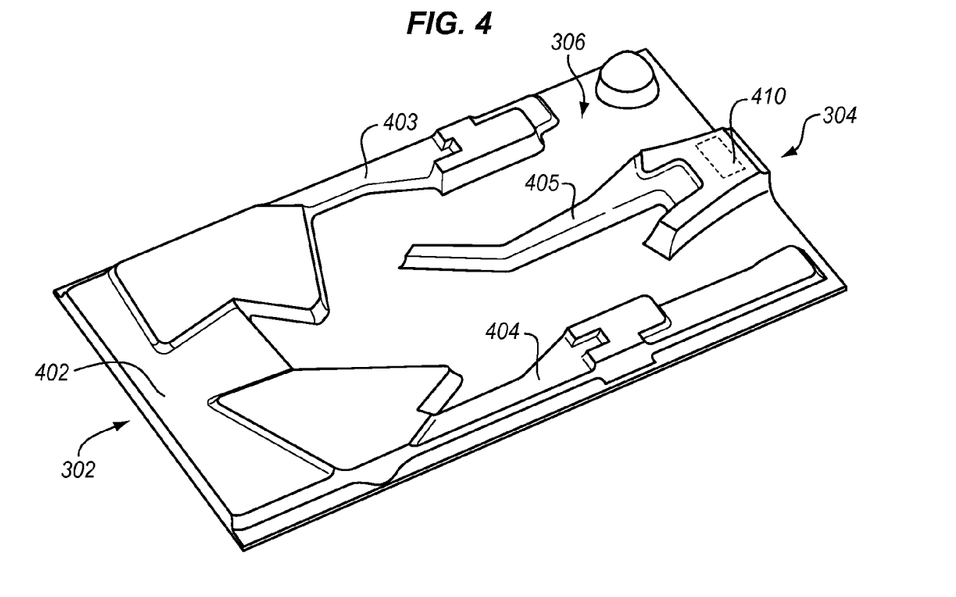
FIG. 4 is an isometric view of an ABS of a slider in an exemplary embodiment of the invention.

FIG. 4 is an isometric view of ABS 306 of slider 114 in an exemplary embodiment of the invention. The shape of ABS 306 as shown in FIG. 4 is just one example, and ABS 306 may take on other desired shapes in other embodiments. In this particular embodiment, ABS 306 includes a front rail 402, two side rails 403-404, and a center rail 405. A read/write head is fabricated toward the trailing end 304 of ABS 306.

According to the embodiments described herein, one or more heating elements are fabricated in slider 114 to actively compensate for a reduction in the flying height of slider 114 while magnetic disk drive 100 is in operation (i.e., by the end user). A heating element comprises any semiconductor element, MR element, or other type of element or component that is able to generate heat responsive to an applied power. The heating element is further operable to generate a protrusion in the ABS 306 of slider 114, which affects the flying characteristics of slider 114. The result is increased lift on the ABS 306 due to the protrusion, which increases the flying height of slider 114. To affect the flying characteristics of slider 114, the heating element or elements may be fabricated in different areas or positions in slider 114. Those skilled in the art understand how to fabricate heating elements in sliders, so a detailed explanation of the fabrication process is omitted for the sake of brevity.

In one embodiment, a heating element used to compensate for a reduction in the flying height of slider 114 may be the same heating element that is used for TFC. As described the Background, TFC uses one or more heating elements to generate a protrusion of a read/write head toward the surface of magnetic disk 104. The dotted box at location 410 illustrates an approximation where one or more TFC heating elements may be fabricated within slider 114, which is proximate to the read/write head. When a TFC heating power is applied to TFC heating element, the TFC heating element causes the read/write head to protrude from the ABS 306 toward the surface of magnetic disk 104 in a controllable fashion. Due to the protrusion of the read/write head at location 410, the clearance between the read/write head and the surface of magnetic disk 104 is reduced.

Figure 5:
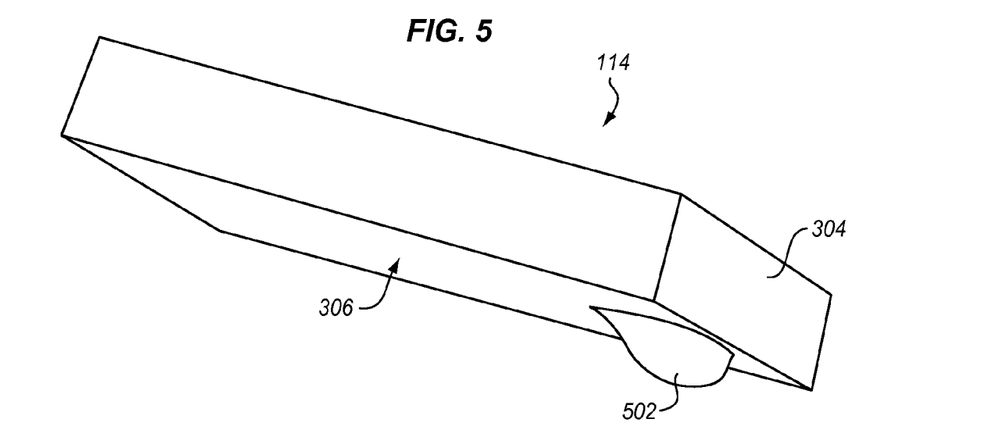
FIG. 5 is an isometric view illustrating a protrusion generated by a TFC heating element in an exemplary embodiment of the invention.

According to this embodiment, the protrusion of the read/write head due to the TFC heating element may also be used to increase the flying height of slider 114. The protrusion would thus be located toward trailing end 304 of slider 114. FIG. 5 is an isometric view illustrating a protrusion 502 generated by a TFC heating element in an exemplary embodiment of the invention. The protrusion 502 in FIG. 5 is caused by a TFC heating element that is fabricated in slider 114 proximate to the read/write head at location 410. For the sake of simplicity, the actual shape of ABS 306 is not illustrated in FIG. 5, but those skilled in the art will appreciate that protrusion 502 is generated toward the trailing end 304 where the read/write head is located.

Figure 6:
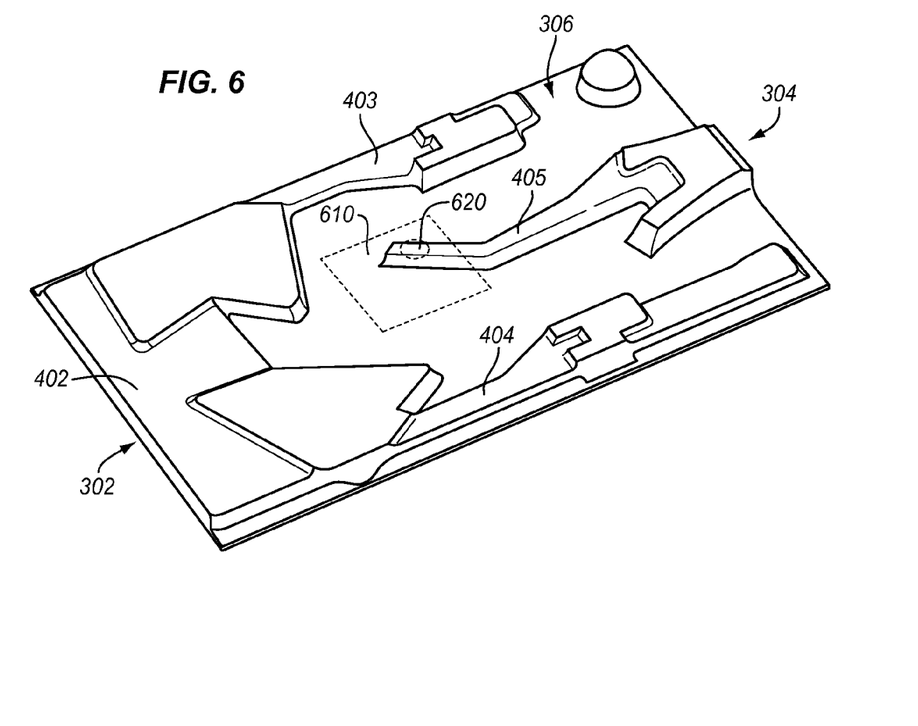
FIG. 6 is an isometric view of an ABS of a slider in an exemplary embodiment of the invention.

In other embodiments, heating elements used to compensate for a reduction in the flying height of slider 114 may additionally or alternatively be fabricated in slider 114 in other locations specifically for flying height compensation. For example, one or more heating elements may be fabricated in slider 114 proximate to a center region of ABS 306 (i.e., centered relative to the plane of the ABS 306). FIG. 6 is an isometric view of ABS 306 of slider 114 in an exemplary embodiment of the invention. The dotted box in location 610 illustrates an approximation where one or more heating elements may be fabricated within slider 114. The heating element(s) is fabricated toward the center or middle of ABS 306. More particularly, a typical slider has a region in the ABS toward the center or middle that is referred to as the sub-ambient pressure area or sub-ambient pressure pocket. The sub-ambient pressure pocket creates a suction force that pulls the slider towards the surface of the magnetic disk. The heating element(s) may be fabricated proximate to the sub-ambient pressure pocket in order to generate a protrusion in or around to the sub-ambient pressure pocket. One particular location 620 of a desired protrusion on ABS 306 is indicated by the dotted circle.

Figure 7:
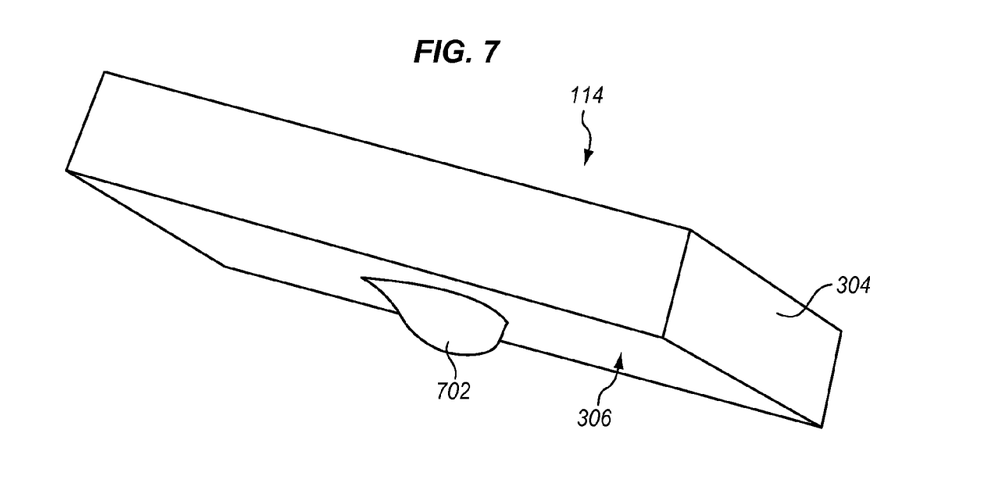
FIG. 7 is an isometric view illustrating a protrusion generated by a heating element fabricated in a slider proximate to a center region of an ABS in an exemplary embodiment of the invention.

FIG. 7 is an isometric view illustrating a protrusion 702 generated by a heating element fabricated in slider 114 proximate to a center region of ABS 306 in an exemplary embodiment of the invention. Due to the location in which the heating element was fabricated within slider 114, the heating element is able to generate a protrusion 702 toward the center of ABS 306. For the sake of simplicity, the actual shape of ABS 306 is not illustrated in FIG. 7, but those skilled in the art will appreciate that protrusion 702 is generated in the center region of the ABS 306 proximate to where a sub-ambient pressure pocket is located.

FIGS. 4 and 6 illustrate two possible locations where heating elements may be fabricated in order to compensate for a reduction in the flying height of slider 114. There may be other locations in slider 114 where one or more heating elements may be fabricated in order to generate a protrusion along ABS 306 that affects the flying characteristics of ABS 306, and increases the flying height of slider 114.

Figure 8:
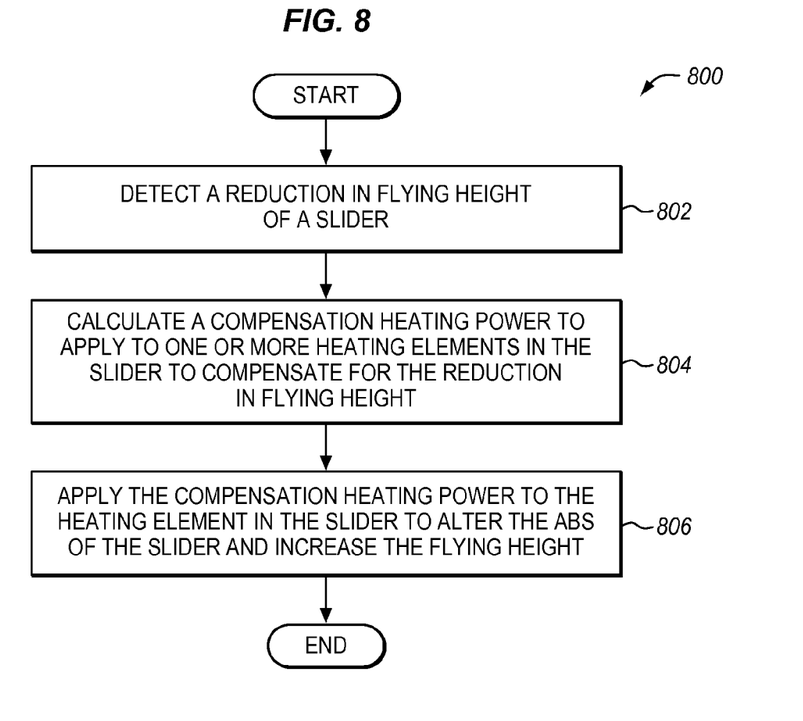
FIG. 8 is a flow chart illustrating a method of actively compensating for a reduction in flying height of a slider in an exemplary embodiment of the invention.

FIG. 8 is a flow chart illustrating a method 800 of actively compensating for a reduction in flying height of slider 114 in an exemplary embodiment of the invention. Flying height compensation is defined as the increase in flying height that is caused by the heat generation of a heating element interacting with the air flow to produce positive air pressure around the protrusion of the heating element. Thus, the increase in flying height then is due ultimately to the increase in surface area of the heating element, which is referred to as the "protrusion" or "bulge". However, the reduction in flying height of slider 114 may result from changes in environmental conditions, or may result from other factors, such as shock and lubricant head pickup effects. Method 800 will be discussed in relation to the magnetic disk drive 100 shown in FIGS. 1-7, although the method may be implemented in other types of disk drives. The steps of the flow chart in FIG. 8 are not all inclusive and may include other steps not shown.

In step 802, flying height compensation system 204 detects a reduction in flying height of slider 114 when magnetic disk drive 100 is in operation. When magnetic disk drive 100 is referred to as being "in operation", magnetic disk drive 100 is being used by an end user, as opposed to being in a test phase or calibration phase by a manufacturer. A reduction in flying height of slider 114 comprises a variation in the actual flying height of slider 114 and an expected flying height of slider 114 by a threshold amount. Flying height compensation system 204 may detect a reduction in flying height in a variety of ways, one of which is illustrated in FIG. 9.

Figure 9:
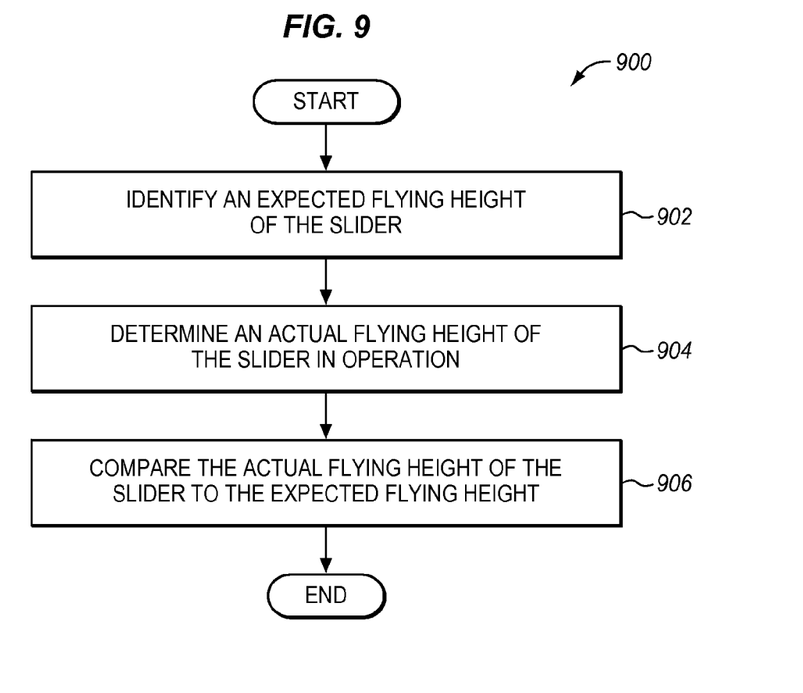
FIG. 9 is a flow chart illustrating a method of detecting a reduction in flying height of a slider in an exemplary embodiment of the invention.

FIG. 9 is a flow chart illustrating a method 900 of detecting a reduction in flying height of slider 114 in an exemplary embodiment of the invention. In step 902, flying height compensation system 204 identifies an expected or desired flying height of slider 114. The expected or desired flying height is referenced to the flying height of slider 114 at sea level (or approximately sea level) and at approximately room temperature that is obtained during the final manufacturing steps of magnetic disk drive 100. In step 904, flying height compensation system 204 determines an actual flying height of slider 114 in operation under the present environmental conditions.

To determine the actual flying height, flying height compensation system 204 may use algorithms, such as the Wallace spacing loss algorithm, or some other means of determining the present flying height of slider 114 while under operation. In step 906, flying height compensation system 204 compares the actual flying height of slider 114 to the expected flying height of slider 114.

If the actual flying height of slider 114 is less than the expected flying height of slider 114 by a threshold variation, then flying height compensation system 204 detects a delta reduction in flying height of slider 114. If the actual flying height of slider 114 is not less than the expected flying height of slider 114 by the threshold variation, then flying height compensation system 204 determines that the flying height of slider 114 is presently at an acceptable level. For example, assume that the expected flying height of slider 114 is 10 nanometers, and the acceptable threshold variation is 3 nanometers. If flying height compensation system 204 determines that the actual flying height of slider 114 is 8 nanometers, then the difference between the expected flying height and the actual flying height is 2 nanometers, which is within the acceptable threshold variation. If flying height compensation system 204 determines that the actual flying height of slider 114 is 6 nanometers, then the difference between the expected flying height and the actual flying height is 4 nanometers, which is outside the acceptable threshold variation. Flying height compensation system 204 will thus detect a reduction in the flying height of slider 114 when the variation is greater than 3 nanometers.

In step 804 of FIG. 8, flying height compensation system 204 calculates a compensation heating power to apply to one or more heating elements in slider 114 to compensate for the reduction in flying height. To calculate the compensation heating power, flying height compensation system 204 may use a lookup table or some other data structure to determine how much power to apply to the heating element to obtain a desired increase in flying height. For example, a lookup table may indicate that the application of 20 mW of heating power to a heating element results in an increase in flying height of 2 nanometers, 20%, or some other metric. The lookup table may indicate that the application of 30 mW of heating power to a heating element results in an increase in flying height of 3 nanometers, 30%, or some other metric. If the heating element being used for flying height compensation is also being used for TFC (i.e., controlling the head-to-disk clearance), then the lookup table will indicate how much of a steady, non-transient increase in heating power should be applied to the TFC heating element to obtain a desired increase in flying height. Based on the lookup table, the flying height compensation system 204 is able to determine what heating power results in slider 114 returning to the expected flying height.

In step 806, flying height compensation system 204 applies the compensation heating power to the heating element or elements in slider 114. The application of the compensation heating power to the heating element(s) operates to alter the ABS 306 of slider 114 and increase the flying height of slider 114. As described above, by applying a heating power to the heating element(s), the heating element(s) generates one or more protrusions in the ABS 306. The more heating power that is applied to the heating element, the larger the protrusion in ABS 306. The protrusion(s) generated by the heating element(s) alters the aerodynamics of the ABS 306 to cause more lift off of the surface of magnetic disk 104. Thus, the flying height of slider 114 is increased due to the application of the heating power.

Figure 10:
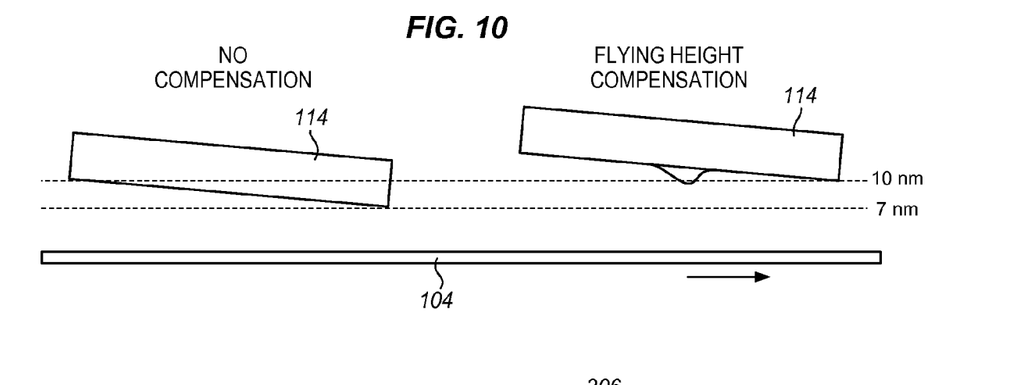
FIG. 10 illustrates how a heating element compensates for a reduction in flying height of a slider in an exemplary embodiment of the invention.

FIG. 10 illustrates how the heating element compensates for the reduction in flying height in an exemplary embodiment of the invention. Assume for this example that a heating element is fabricated in slider 114 in a center region of ABS 306, as is illustrated in FIGS. 6-7. The left-hand side of FIG. 10 illustrates the case where there is no compensation meaning that no heating power is applied to the heating element in slider 114. Due to the environmental conditions, the flying height of the slider 114 is about 7 nanometers. The right-hand side of FIG. 10 illustrates the case where a heating power is being applied to the heating element to generate a protrusion on the ABS 306. The protrusion generated by the heating element causes slider 114 to fly higher in relation to the surface of magnetic disk 104, which compensates for the reduction in flying height due to the environmental conditions.

Figure 11:
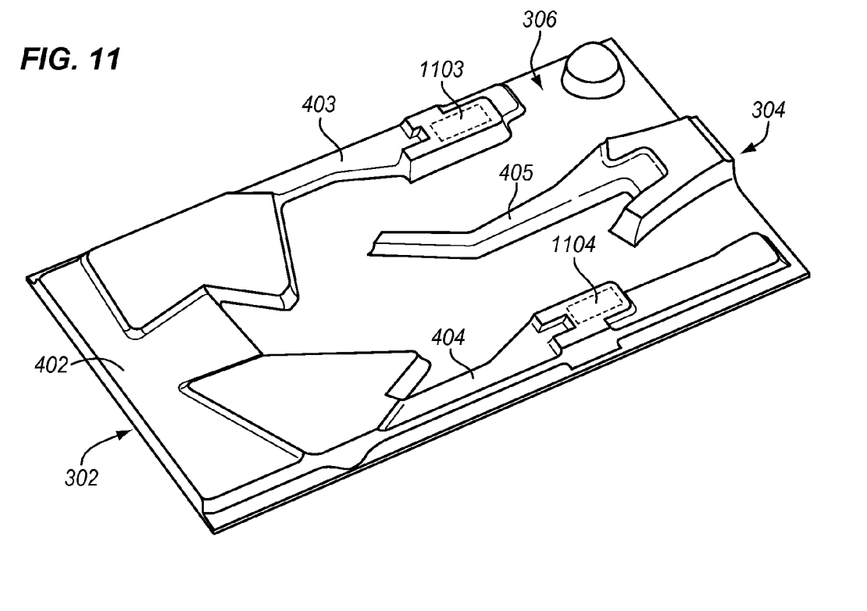
FIG. 11 is an isometric view of an ABS of a slider in an exemplary embodiment of the invention.

In addition to using a heating element to compensate for a reduction in flying height, one or more heating elements may be used to compensate for other flying issues of slider 114. For example, heating elements may be used to compensate for roll of slider 114. Roll occurs when slider 114 tilts toward the outer diameter of magnetic disk 104 or tilts toward the inner diameter of magnetic disk 104. To compensate for roll, a first heating element may be fabricated in a side rail region of ABS 306, and a second heating element may be fabricated in the opposite side rail region. FIG. 11 is an isometric view of the ABS 306 of slider 114 in an exemplary embodiment of the invention. The dotted box in location 1103 illustrates an approximation of where one or more heating elements may be fabricated within slider 114 proximate to side rail 403. The dotted box in location 1104 illustrates an approximation of where one or more heating elements may be fabricated within slider 114 proximate to side rail 404. The heating elements are fabricated proximate to the side rails 403-404 in order to generate protrusions on side rails 403-404.

Figure 12:
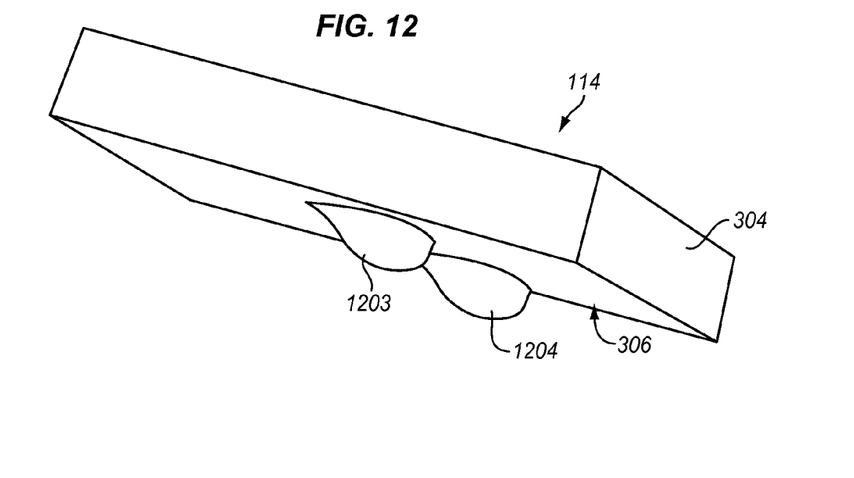
FIG. 12 is an isometric view illustrating protrusions generated by heating elements fabricated in side rails of an ABS in an exemplary embodiment of the invention.

FIG. 12 is an isometric view illustrating protrusions 1203-1204 generated by heating elements fabricated in side rails 403-404 of the ABS in an exemplary embodiment of the invention. Due to the position in which the heating elements are fabricated within slider 114, the heating elements are able to generate protrusions 1203-1204 in side rails 403-404, respectively. For the sake of simplicity, the actual shape of ABS 306 is not illustrated in FIG. 12, but those skilled in the art will appreciate that protrusion 1203 is generated in side rail 403 and protrusion 1204 is generated in side rail 404 (see FIG. 11).

Figure 13:
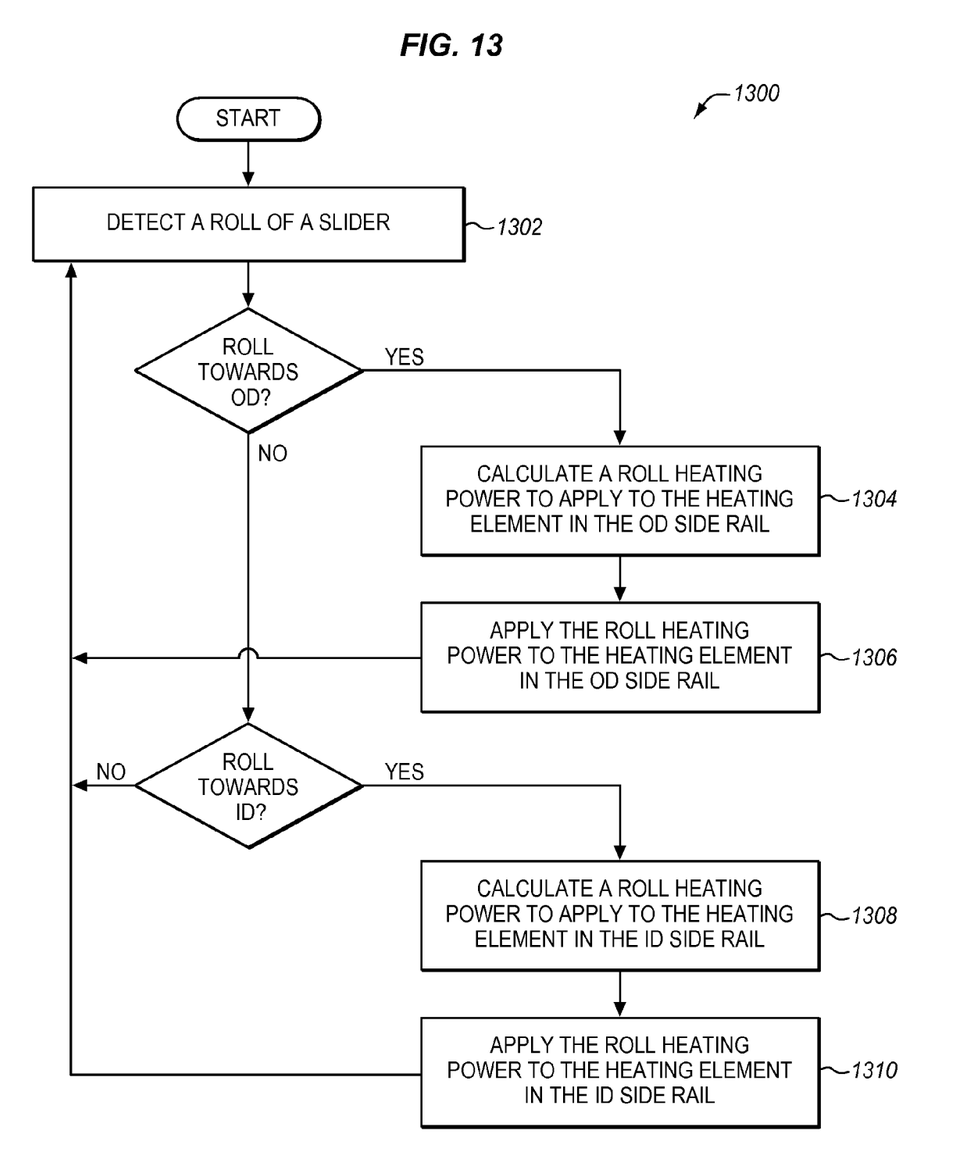
FIG. 13 is a flow chart illustrating a method of compensating for roll of a slider in an exemplary embodiment of the invention.

FIG. 13 is a flow chart illustrating a method 1300 of compensating for roll of a slider 114 in an exemplary embodiment of the invention. In step 1302, flying height compensation system 204 detects a roll of slider 114. Flying height compensation system 204 may detect roll in a variety of ways, such as by identifying soft errors, by identifying hard errors, or by identifying roll contact of slider 114 with magnetic disk 104. In response to detecting roll toward the outer diameter (OD) of magnetic disk 104, flying height compensation system 204 calculates a roll heating power to apply to the heating element in the OD side rail of slider 114 (which is side rail 403 in FIG. 11) in step 1304. Flying height compensation system 204 then applies the roll heating power to the heating element in the OD side rail in step 1306. In response to detecting roll toward the inner diameter (ID) of magnetic disk 104, flying height compensation system 204 calculates a roll heating power to apply to the heating element in the ID side rail of slider 114 (which is side rail 404 in FIG. 11) in step 1308. Flying height compensation system 204 then applies the roll heating power to the heating element in the ID side rail in step 1310.

Although the heating elements in side rails 403-404 are used to compensate for roll in the above embodiment, the same heating elements may be used to increase flying height.

The flying height compensation process as described in FIG. 8 may be activated, initiated, or performed in a variety of scenarios. For example, the flying height compensation process may be performed upon power up of magnetic disk drive 100. When magnetic disk drive 100 is powered down, slider 114 is automatically unloaded from magnetic disk 104 because magnetic disk drive 100 implements ramp load/unload functionality. Thus, when magnetic disk drive 100 is powered on, flying height compensation system 204 may initiate method 800 to detect the actual flying height of slider 114 and compensate accordingly. This advantageously ensures that slider 114 is flying at a desired height each time magnetic disk drive 100 is powered on.

Alternatively, the flying height compensation process may be performed periodically based on threshold time periods. In another alternative, the flying height compensation process may be performed responsive to detecting a change to environment conditions. As an example, flying height compensation system 204 may be in communication with a sensor that is able to detect a change in altitude. As another example, flying height compensation system 204 may be in communication with a sensor that is able to detect a change in temperature. When flying height compensation system 204 has detected that altitude or temperature has changed by a threshold amount, then the flying height compensation process may be performed. Those skilled in the art will appreciate that any combination of the above scenarios for performing the flying height compensation process may be used, and that other scenarios for performing the flying height compensation process exist that are not discussed for the sake of brevity.

One additional advantage of generating a protrusion on the ABS 306 of slider 114 is faster unloading of slider 114 from magnetic disk 104. This faster unloading advantage produces a smaller disk unloading real estate needed to unload slider 114 from magnetic disk 104 and onto ramp assembly 230. Thus, slider 114 may be removed from magnetic disk 104 in a shorter time and within a shorter distance. One factor contributing to the time needed to unload slider 114 from magnetic disk 104 is the suction force provided by the sub-ambient pressure pocket. To reduce the time needed for unloading slider 114, one or more heating elements may be fabricated proximate to the sub-ambient pressure pocket, as is illustrated in FIGS. 6-7. Control system 200 may then control the heating element proximate to the sub-ambient pressure pocket, as is illustrated in FIG. 14.

Figure 14:
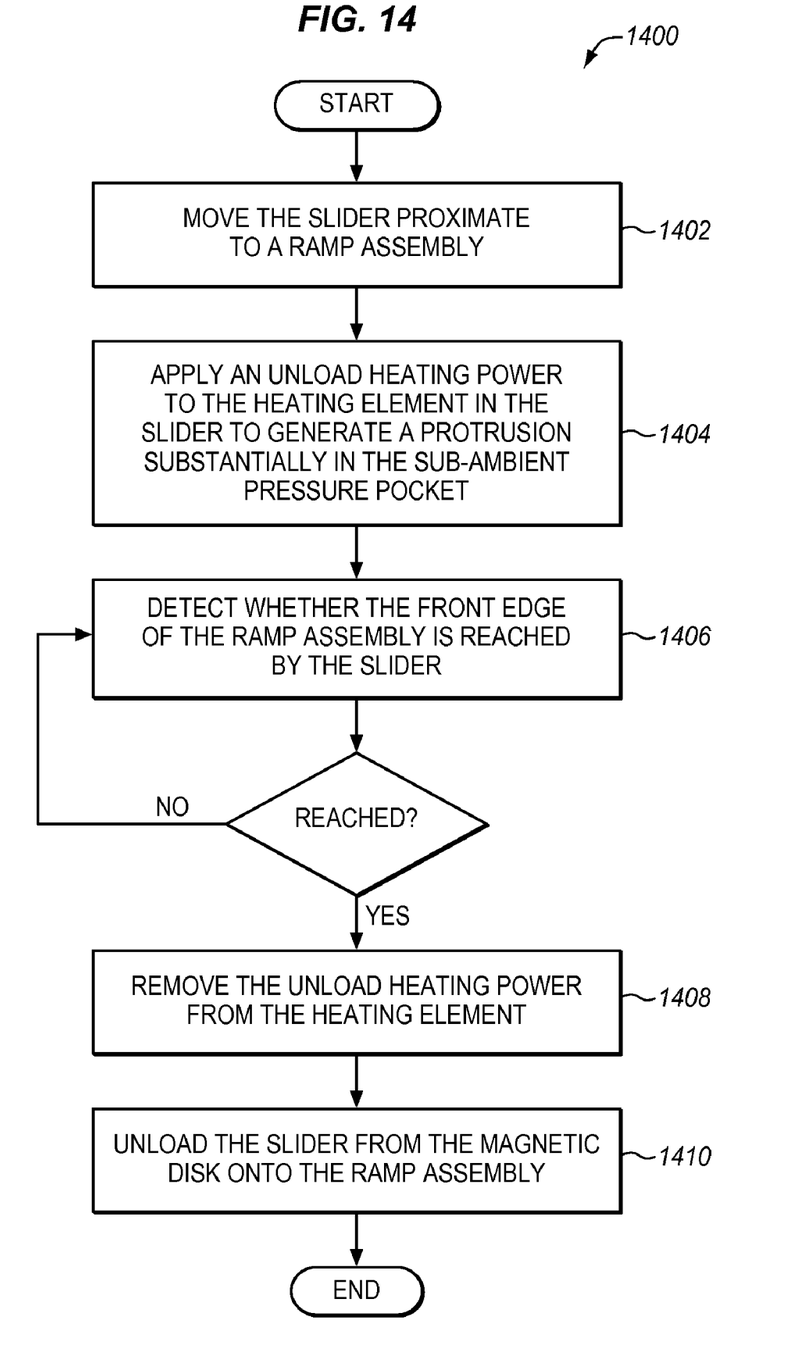
FIG. 14 is a flow chart illustrating a method of using a heating element to unload a slider in an exemplary embodiment of the invention.

FIG. 14 is a flow chart illustrating a method of using a heating element to unload slider 114 in an exemplary embodiment of the invention. In step 1402, flying height compensation system 204 moves slider 114 proximate to ramp assembly 230 (see FIG. 2). In step 1404, flying height compensation system 204 applies an unload heating power to the heating element in slider 114 to generate a protrusion substantially in the sub-ambient pressure pocket of the ABS 306. In step 1406, flying height compensation system 204 detects whether the front edge of ramp assembly 230 is reached by slider 114. The front edge of ramp assembly 230 comprises the edge that slider 114 will first contact on ramp assembly 230 when unloaded from magnetic disk 104. If the front edge of ramp assembly 230 is reached, then flying height compensation system 204 removes the unload heating power from the heating element in step 1408. Flying height compensation system 204 then unloads slider 114 from magnetic disk 104 onto the ramp assembly 230 in step 1410.

By generating the protrusion in the sub-ambient pressure pocket before unloading, the amount of suction force between slider 114 and magnetic disk 104 is reduced. This makes it easier to lift slider 114 off of magnetic disk 104 to begin the unload process, and advantageously reduces the unload time for slider 114.

Another additional advantage of generating a protrusion on the ABS 306 of slider 114 is to slowly load slider 114 from ramp assembly 230 onto the surface of magnetic disk 104. The heating element in the location ABS 306 prevents a large sub-ambient pressure region to be generated during the load process. This allows for a more gentle load rather than a quick snap load. A quick snap load of slider 114 resulting from a large sub-ambient pressure pocket may cause intermittent head-to-disk interaction with the corners or side rails of slider 114. During a quick snap load, the pitch and roll movements of slider 114 due to the aerodynamic air flow have not had time to stabilize. This may create a large pitch down, large pitch up, or large negative or positive roll attitude just before loading slider 114 on magnetic disk 104, which may allow the corners to interact with magnetic disk 104. A gentle load will allow a slower, more reliable load that prevents these head-to-disk interactions, thereby reducing disk scratches.

Figure 15:
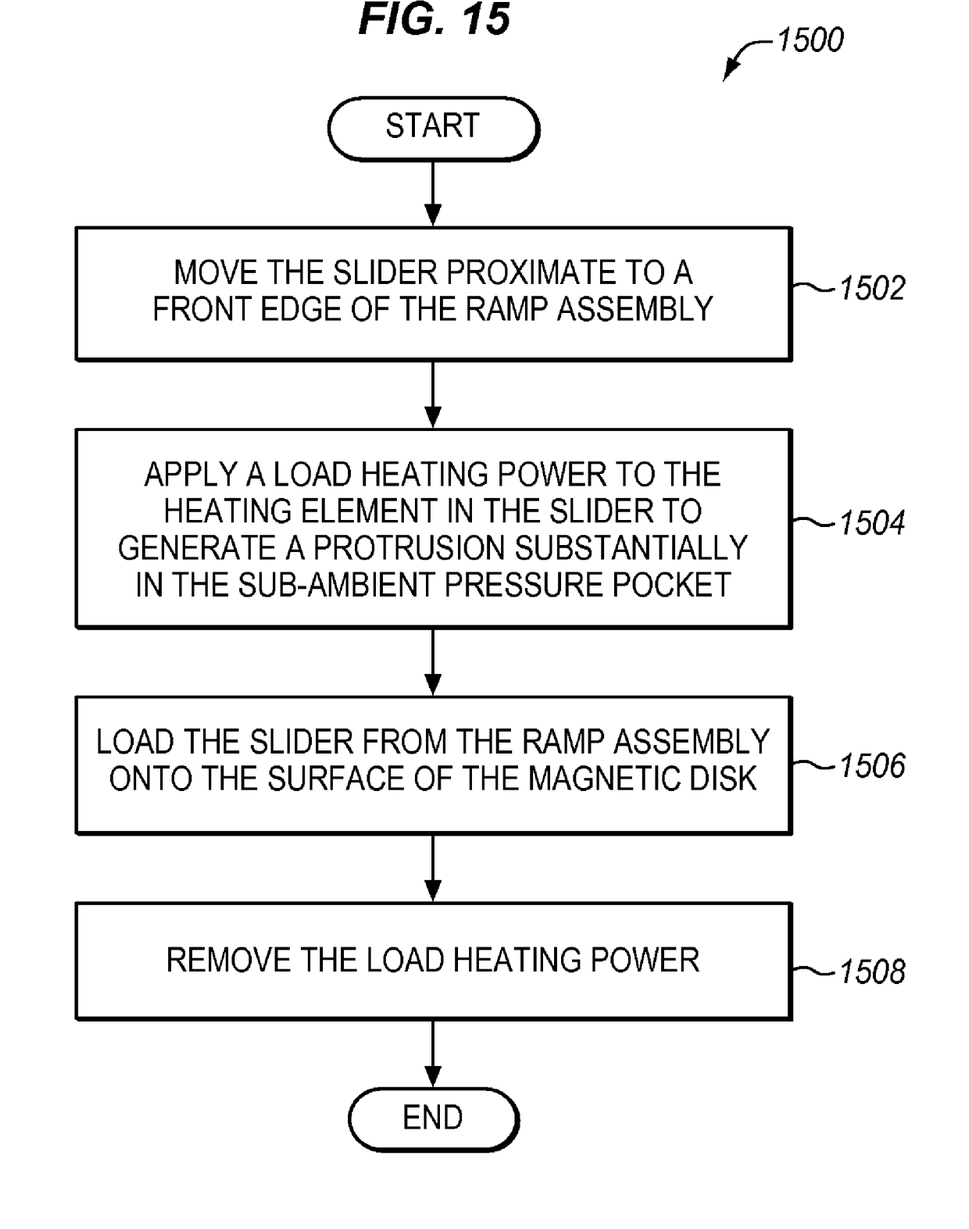
FIG. 15 is a flow chart illustrating a method of using a heating element to load a slider in an exemplary embodiment of the invention.

FIG. 15 is a flow chart illustrating a method 1500 of using the heating element to load slider 114 in an exemplary embodiment of the invention. In step 1502, flying height compensation system 204 moves slider 114 proximate to a front edge of ramp assembly 230 (see FIG. 2). In step 1504, flying height compensation system 204 applies a load heating power to the heating element in slider 114 to generate a protrusion substantially in the sub-ambient pressure pocket of the ABS 306. The load heating power is applied just prior to loading slider 114 onto magnetic disk 104. In step 1506, flying height compensation system 204 loads slider 114 from the ramp assembly 230 to the surface of magnetic disk 104. After loading slider 114 onto magnetic disk 104, flying height compensation system 204 removes the load heating power in step 1508.

By generating the protrusion in the sub-ambient pressure pocket just before loading, the amount of suction force between slider 114 and magnetic disk 104 is reduced. This allows for a safer and more reliable load of slider 114 onto magnetic disk 104, which prevents corner and side dings of slider 114 from occurring on the surface of magnetic disk 104.

Although specific embodiments were described herein, the scope of the invention is not limited to those specific embodiments. The scope of the invention is defined by the following claims and any equivalents thereof.

We claim:

1. A magnetic disk drive operable to perform active flying height compensation, the magnetic disk drive comprising:
   a magnetic disk;
   a slider having an air bearing surface that faces a surface of the magnetic disk;
   at least one heating element fabricated in the slider; and
   a control system operable to detect a reduction in flying height of the slider, to calculate a compensation heating power to apply to the at least one heating element in the slider to compensate for the reduction in flying height, and to apply the compensation heating power to the at least one heating element in the slider to alter the air bearing surface and increase the flying height of the slider.

2. The magnetic disk drive of claim 1 wherein:
the control system is further operable to detect the reduction in flying height of the slider upon power up of the magnetic disk drive.

3. The magnetic disk drive of claim 1 wherein:
the at least one heating element in the slider comprises a Thermal Flying-height control heating element; and
the control system is further operable to apply the compensation heating power to the at least one heating element to generate a protrusion of a read/write head in the slider.

4. The magnetic disk drive of claim 1 wherein:
the at least one heating element in the slider is fabricated proximate to a center region of the slider; and
the control system is further operable to apply the compensation heating power to the at least one heating element to generate a protrusion substantially in the center of the air bearing surface of the slider.

5. The magnetic disk drive of claim 1 wherein:
the at least one heating element in the slider is fabricated proximate to a sub-ambient pressure pocket on the air bearing surface of the slider; and
the control system is further operable to apply the compensation heating power to the at least one heating element to generate a protrusion substantially in the sub-ambient pressure pocket of the air bearing surface.

6. The magnetic disk drive of claim 5 wherein:
the control system is further operable to move the slider proximate to a ramp assembly in the magnetic disk drive, to apply an unload heating power to the at least one heating element to generate a protrusion substantially in the sub-ambient pressure pocket of the air bearing surface, to detect whether a front edge of the ramp assembly is reached by the slider, to remove the unload heating power if the front edge of the ramp assembly is reached, and to unload the slider from the magnetic disk onto the ramp assembly.

7. The magnetic disk drive of claim 5 wherein:
the control system is further operable to move the slider proximate to a front edge of a ramp assembly in the magnetic disk drive, to apply a load heating power to the at least one heating element to generate a protrusion substantially in the sub-ambient pressure pocket of the air bearing surface, to load the slider from the ramp assembly onto the magnetic disk, and to remove the load heating power.

8. The magnetic disk drive of claim 1 wherein the at least one heating element in the slider comprises:
an outer diameter heating element fabricated in the slider to generate a protrusion in an outer diameter side rail of the air bearing surface of the slider; and
an inner diameter heating element fabricated in the slider to generate a protrusion in an inner diameter side rail of the air bearing surface of the slider.

9. The magnetic disk drive of claim 8 wherein:
the control system is further operable to detect a roll of the slider, to calculate a roll heating power to apply to the outer diameter heating element in response to detecting a roll toward the outer diameter of the magnetic disk, to apply the roll heating power to the outer diameter heating element, to calculate the roll heating power to apply to the inner diameter heating element in response to detecting a roll toward the inner diameter of the magnetic disk, and to apply the roll heating power to the inner diameter heating element.

10. A method of performing an active flying height compensation process for a magnetic disk drive, the method comprising:
detecting a reduction in flying height of a slider in the magnetic disk drive when the magnetic disk drive is in operation;
calculating a compensation heating power to apply to at least one heating element in the slider to compensate for the reduction in flying height; and
applying the compensation heating power to the at least one heating element in the slider to alter the air bearing surface and increase the flying height of the slider.

11. The method of claim 10 wherein the flying height compensation process is performed upon power up of the magnetic disk drive.

12. The method of claim 10 wherein:
the at least one heating element in the slider comprises a Thermal Flying-height control heating element; and
applying the compensation heating power to the at least one heating element generates a protrusion of a read/write head in the slider.

13. The method of claim 10 wherein:
the at least one heating element in the slider is fabricated proximate to a center region of the slider; and
applying the compensation heating power to the at least one heating element generates a protrusion substantially in the center of the air bearing surface of the slider.

14. The method of claim 10 wherein:
the at least one heating element in the slider is fabricated proximate to a sub-ambient pressure pocket on the air bearing surface of the slider; and
applying the compensation heating power to the at least one heating element generates a protrusion substantially in the sub-ambient pressure pocket of the air bearing surface.

15. The method of claim 14 further comprising:
moving the slider proximate to a ramp assembly in the magnetic disk drive;
applying an unload heating power to the at least one heating element to generate a protrusion substantially in the sub-ambient pressure pocket of the air bearing surface;
detecting whether a front edge of the ramp assembly is reached by the slider;
removing the unload heating power if the front edge of the ramp assembly is reached; and
unloading the slider from the magnetic disk onto the ramp assembly.

16. The method of claim 14 further comprising:
moving the slider proximate to a front edge of a ramp assembly in the magnetic disk drive;
applying a load heating power to the at least one heating element to generate a protrusion substantially in the sub-ambient pressure pocket of the air bearing surface;
loading the slider from the ramp assembly onto the magnetic disk; and
removing the load heating power.

17. The method of claim 10 wherein the at least one heating element in the slider comprises:
an outer diameter heating element fabricated in the slider to generate a protrusion in an outer diameter side rail of the air bearing surface of the slider; and
an inner diameter heating element fabricated in the slider to generate a protrusion in an inner diameter side rail of the air bearing surface of the slider.

18. The method of claim 17 further comprising:
detecting a roll of the slider;
calculating a roll heating power to apply to the outer diameter heating element in response to detecting a roll toward the outer diameter of the magnetic disk;
applying the roll heating power to the outer diameter heating element;
calculating the roll heating power to apply to the inner diameter heating element in response to detecting a roll toward the inner diameter of the magnetic disk; and
applying the roll heating power to the inner diameter heating element.

19. A control system of a magnetic disk drive that is operable to perform active flying height compensation for a slider, the control system comprising:
a flying height compensation system operable to identify an expected flying height of a slider in the magnetic disk drive, to determine an actual flying height of the slider in operation, and to compare the actual flying height of the slider to the expected flying height to detect a reduction in flying height of the slider;
the flying height compensation system further operable to calculate a compensation heating power to apply to at least one heating element in the slider to compensate for the reduction in flying height; and
the flying height compensation system further operable to apply the compensation heating power to the at least one heating element in the slider to generate at least one protrusion in the air bearing surface and increase the flying height of the slider.

20. The control system of claim 19 wherein:
the flying height compensation system is further operable to detect the reduction in flying height of the slider upon power up of the magnetic disk drive.

21. The control system of claim 19 wherein:
the at least one heating element in the slider comprises a Thermal Flying-height control heating element; and
the flying height compensation system is further operable to apply the heating power to the at least one heating element to generate the at least one protrusion of a read/write head in the slider.

22. The control system of claim 19 wherein:
the at least one heating element in the slider is fabricated proximate to a sub-ambient pressure pocket on the air bearing surface of the slider; and
the flying height compensation system is further operable to apply the heating power to the at least one heating element to generate a protrusion substantially in the sub-ambient pressure pocket of the air bearing surface.

23. The control system of claim 19 wherein the at least one heating element in the slider comprises:
an outer diameter heating element fabricated in the slider to generate a protrusion in an outer diameter side rail of the air bearing surface of the slider; and
an inner diameter heating element fabricated in the slider to generate a protrusion in an inner diameter side rail of the air bearing surface of the slider.

24. The control system of claim 23 wherein:
the flying height compensation system is further operable to detect a roll of the slider, to calculate a roll heating power to apply to the outer diameter heating element in response to detecting a roll toward the outer diameter of the magnetic disk, to apply the roll heating power to the outer diameter heating element, to calculate the roll heating power to apply to the inner diameter heating element in response to detecting a roll toward the inner diameter of the magnetic disk, and to apply the roll heating power to the inner diameter heating element.

25. A magnetic disk drive, comprising:
a magnetic disk;
a slider having an air bearing surface that faces a surface of the magnetic disk;
at least one heating element fabricated in the slider proximate to a sub-ambient pressure pocket on the air bearing surface of the slider;
a ramp assembly; and
a control system operable to move the slider proximate to the ramp assembly, to apply an unload heating power to the at least one heating element to generate a protrusion substantially in the sub-ambient pressure pocket of the air bearing surface, to detect whether a front edge of the ramp assembly is reached by the slider, to remove the unload heating power if the front edge of the ramp assembly is reached, and to unload the slider from the magnetic disk onto the ramp assembly;
the control system is further operable to move the slider proximate to the front edge of the ramp assembly, to apply a load heating power to the at least one heating element to generate a protrusion substantially in the sub-ambient pressure pocket of the air bearing surface, to load the slider from the ramp assembly onto the magnetic disk, and to remove the load heating power.

* * * * *

UNITED STATES PATENT AND TRADEMARK OFFICE
CERTIFICATE OF CORRECTION

| | | |
|---|---|---|
| PATENT NO. | : 7,817,371 B2 | Page 1 of 1 |
| APPLICATION NO. | : 12/328309 | |
| DATED | : October 19, 2010 | |
| INVENTOR(S) | : Bolasna et al. | |

It is certified that error appears in the above-identified patent and that said Letters Patent is hereby corrected as shown below:

In column 9, line 67, "instep 1410" should read "in step 1410".

Signed and Sealed this
Eighteenth Day of January, 2011

David J. Kappos
*Director of the United States Patent and Trademark Office*